(12) United States Patent
Brown et al.

(10) Patent No.: US 7,353,531 B2
(45) Date of Patent: Apr. 1, 2008

(54) TRUSTED COMPUTING ENVIRONMENT

(75) Inventors: Richard Brown, Bristol (GB); Siani Lynne Pearson, Bristol (GB); Christopher I. Dalton, Bristol (GB)

(73) Assignee: Hewlett-Packard Development Company L.P., Houston, TX (US)

( * ) Notice: Subject to any disclaimer, the term of this patent is extended or adjusted under 35 U.S.C. 154(b) by 975 days.

(21) Appl. No.: 10/080,477

(22) Filed: Feb. 22, 2002

(65) Prior Publication Data

US 2002/0119427 A1    Aug. 29, 2002

(30) Foreign Application Priority Data

Feb. 23, 2001    (GB)    ................. 0104670.5

(51) Int. Cl.
*H04L 9/00*    (2006.01)

(52) U.S. Cl. ............... 726/1; 726/3; 709/220; 709/221; 709/222; 709/223

(58) Field of Classification Search ............... 713/200, 713/201; 235/380; 434/1; 710/107; 380/52, 380/25; 709/220–223, 224, 229; 726/1, 726/3; 705/50, 64
See application file for complete search history.

(56) References Cited

U.S. PATENT DOCUMENTS

| | | | |
|---|---|---|---|
| 5,032,979 A | 7/1991 | Hecht et al. | |
| 5,144,660 A | 9/1992 | Rose | 713/200 |
| 5,283,828 A | 2/1994 | Saunders et al. | 713/192 |
| 5,341,422 A | 8/1994 | Blackledge et al. | 726/5 |
| 5,359,659 A | 10/1994 | Rosenthal | 380/4 |
| 5,361,359 A | 11/1994 | Tajalli et al. | |
| 5,404,532 A | 4/1995 | Allen et al. | |
| 5,421,006 A | 5/1995 | Jablon et al. | |
| 5,440,723 A | 8/1995 | Arnold et al. | |
| 5,448,045 A | 9/1995 | Clark | 235/382 |
| 5,491,750 A | 2/1996 | Bellare et al. | 713/155 |
| 5,511,184 A | 4/1996 | Lin | 710/261 |
| 5,572,590 A | 11/1996 | Chess | 380/4 |
| 5,619,571 A | 4/1997 | Sandstrom et al. | 380/4 |
| 5,701,343 A | 12/1997 | Takashima et al. | 705/51 |
| 5,706,431 A * | 1/1998 | Otto | 709/221 |
| 5,774,717 A | 6/1998 | Porcaro | 707/202 |

(Continued)

FOREIGN PATENT DOCUMENTS

CA    2187855    6/1997

(Continued)

OTHER PUBLICATIONS

"System for Detecting Undesired Alteration of Software," *IBM Technical Disclosure Bulletin*, vol. 32, No. 11, pp. 48-50 (Apr. 1990).

(Continued)

*Primary Examiner*—Thanhnga Truong
(74) *Attorney, Agent, or Firm*—Ladas & Parry, LLP

(57) ABSTRACT

A trusted computing environment 100, wherein each computing device 112 to 118 holds a policy specifying the degree to which it can trust the other devices in the environment 100. The policies are updated by an assessor 110 which receives reports from trusted components 120 in the computing devices 112 to 118 which identify the trustworthiness of the computing devices 112 to 118.

18 Claims, 2 Drawing Sheets

U.S. PATENT DOCUMENTS

| | | | |
|---|---|---|---|
| 5,809,145 A | 9/1998 | Slik et al. | 380/25 |
| 5,815,702 A | 9/1998 | Kannan et al. | 712/244 |
| 5,819,261 A | 10/1998 | Takahashi et al. | 707/3 |
| 5,841,868 A * | 11/1998 | Helbig, Sr. | 235/380 |
| 5,841,869 A | 11/1998 | Merkling et al. | 713/164 |
| 5,844,986 A | 12/1998 | Davis | 380/4 |
| 5,890,142 A | 3/1999 | Tanimura et al. | 706/12 |
| 5,892,900 A | 4/1999 | Ginter et al. | 726/26 |
| 5,892,902 A | 4/1999 | Clark | 726/5 |
| 5,937,159 A * | 8/1999 | Meyers et al. | 713/201 |
| 5,940,513 A | 8/1999 | Aucsmith et al. | 713/187 |
| 5,958,016 A | 9/1999 | Chang et al. | 709/229 |
| 5,966,732 A | 10/1999 | Assaf | 711/170 |
| 6,021,510 A | 2/2000 | Nachenberg | 714/38 |
| 6,038,667 A | 3/2000 | Helbig | 726/16 |
| 6,081,894 A | 6/2000 | Mann | 713/188 |
| 6,091,956 A | 7/2000 | Hollenberg | 455/456.5 |
| 6,098,133 A * | 8/2000 | Summers et al. | 710/107 |
| 6,115,819 A | 9/2000 | Anderson | 726/20 |
| 6,253,324 B1 | 6/2001 | Field et al. | 713/187 |
| 6,253,349 B1 | 6/2001 | Maeda et al. | 714/799 |
| 6,266,774 B1 | 7/2001 | Sampath et al. | 713/201 |
| 6,289,462 B1 * | 9/2001 | McNabb et al. | 713/201 |
| 6,327,533 B1 | 12/2001 | Chou | 701/207 |
| 6,327,652 B1 | 12/2001 | England et al. | 713/2 |
| 6,330,670 B1 | 12/2001 | England et al. | 713/2 |
| 6,374,250 B2 | 4/2002 | Ajtai et al. | 707/701 |
| 6,405,318 B1 | 6/2002 | Rowland | 713/200 |
| 6,414,635 B1 | 7/2002 | Stewart et al. | 342/457 |
| 6,507,909 B1 | 1/2003 | Zurko et al. | 713/164 |
| 6,510,418 B1 | 1/2003 | Case et al. | 705/26 |
| 6,529,143 B2 | 3/2003 | Mikkola et al. | 340/995.1 |
| 6,529,728 B1 | 3/2003 | Pfeffer et al. | 455/418 |
| 6,539,425 B1 * | 3/2003 | Stevens et al. | 709/220 |
| 6,609,199 B1 | 8/2003 | DeTreville | 713/172 |
| 6,650,902 B1 | 11/2003 | Richton | 455/456.3 |
| 6,678,827 B1 * | 1/2004 | Rothermel et al. | 726/6 |
| 6,678,833 B1 | 1/2004 | Grawrock | 713/401 |
| 6,694,434 B1 | 2/2004 | McGee et al. | 713/189 |
| 6,697,944 B1 | 2/2004 | Jones et al. | 713/168 |
| 6,716,101 B1 | 4/2004 | Meadows et al. | 455/456.1 |
| 6,757,824 B1 | 6/2004 | England | 713/156 |
| 6,772,331 B1 | 8/2004 | Hind et al. | 713/151 |
| 6,785,015 B1 * | 8/2004 | Smith et al. | 358/1.15 |
| 6,799,270 B1 | 9/2004 | Bull et al. | 713/153 |
| 6,853,988 B1 | 2/2005 | Dickinson et al. | 705/75 |
| 6,868,406 B1 | 3/2005 | Ogg et al. | 705/53 |
| 6,889,325 B1 | 5/2005 | Sipman et al. | 713/176 |
| 6,948,073 B2 | 9/2005 | England et al. | 380/201 |
| 2001/0037450 A1 | 11/2001 | Metlitski et al. | 713/152 |
| 2001/0051515 A1 | 12/2001 | Rygaard | 455/410 |
| 2002/0012432 A1 | 1/2002 | England et al. | 380/231 |
| 2002/0023212 A1 | 2/2002 | Proudler | 713/164 |
| 2002/0095454 A1 | 7/2002 | Reed et al. | 709/201 |
| 2002/0184488 A1 | 12/2002 | Amini et al. | 713/153 |
| 2003/0018892 A1 | 1/2003 | Tello | 713/164 |
| 2003/0037237 A1 | 2/2003 | Abgrall et al. | 713/166 |

FOREIGN PATENT DOCUMENTS

| | | |
|---|---|---|
| EP | 0 304 033 A2 | 2/1989 |
| EP | 0 580 350 A1 | 1/1994 |
| EP | 0 825 511 A2 | 2/1998 |
| EP | 0 849 657 A1 | 6/1998 |
| EP | 0 465 016 B1 | 12/1998 |
| EP | 0 895 148 A1 | 2/1999 |
| EP | 1 030 237 A1 | 8/2000 |
| EP | 1 056 014 A1 | 11/2000 |
| GB | 2 336 918 | 11/1999 |
| GB | 2 353 885 A | 3/2001 |
| JP | 2001-0016655 | 1/2001 |
| WO | 93/25024 | 12/1993 |
| WO | 94/11967 | 5/1994 |
| WO | 95/24696 | 9/1995 |
| WO | 95/27249 | 10/1995 |
| WO | 9729416 | 8/1997 |
| WO | 98/26529 | 6/1998 |
| WO | 98/36517 | 8/1998 |
| WO | 98/40809 | 9/1998 |
| WO | 98/45778 | 10/1998 |
| WO | 95/27249 | 10/1999 |
| WO | 00/31644 | 6/2000 |
| WO | 00/48062 | 8/2000 |
| WO | 00/48063 | 8/2000 |
| WO | 00/54125 | 9/2000 |
| WO | 00/54126 | 9/2000 |
| WO | 00/73913 A1 | 12/2000 |
| WO | 01/23980 | 4/2001 |

OTHER PUBLICATIONS

Bontchev, V., "Possible Virus Attacks Against Integrity Programs and How to Prevent Them," *Virus Bulletin Conference*, pp. 131-141 (Sep. 1992).

Radai, Y., "Checksumming Techniques for Anti-Viral Purposes," *Virus Bulletin Conference*, pp. 39-68 (Sep. 1991).

Intel, "Wired for Management Baseline specification v2.0," *Boot Integrity Services Application Programming Interface Version 1.0*, 64 pages (Dec. 28, 1998).

"Information technology-Security techniques-Entity Authentication—Part 3: Mechanisms using digital signature techniques," *ISO/IEC 9798-3*, 6 pages (1998).

"Information technology-Security techniques-Key management—Part 3; Mechanisms using asymmetric techniques," *ISO/IEC 11770-3*, pp. 1-23 and Annexes A-E (1999).

The Trusted Computing Platform Alliance, "Building a Foundation of Trust in the PC," 9 pages, located at Internet address <www.trustedpc.org/home/home.html> (Jan. 2000).

Trusted Computing Platform Alliance, Main Specification Version 1.0, 284 pages (Jan. 25, 2001).

Anderson, R., et al., "Tamper Resistance—a Cautionary Note," *ISENIX Association, Second USENIX Workshop on Electronic Commerce*, pp. 1-11 (Nov. 18-21, 1996).

Naor, M., et al., "Secure and Efficient Metering," Internet: <http://citeseer.nj.com/naor98secure.html> Sections 1-1.3 (1998).

Yee, B., "Using Secure Coprocessors," Doctoral thesis—Carnegie Mellon University, pp. 1-94 (May 1994).

"HP Virtualvault: Trusted Web-server Platform Product Brief," Internet: <http://www.hp.com/security/products/virtualvault/papers/brief_4.0/> pp. 1-6.

"NIST Announces Technical Correction to Secure Hash Standard," Internet: <http://www.nist.gov/public_affairs/releases/hashstan.htm> pp. 1-2 (Oct. 24, 2002).

"Secure Computing with JAVA™: Now and the Future," Internet: <http://java.sun.com/marketing/collateral/security.html> pp. 1-29 (Apr. 2, 2002).

U.S. Appl. No. 09/979,902, filed Nov. 27, 2001, Proudler et al.
U.S. Appl. No. 09/979,903, filed Nov. 27, 2001, Proudler et al.
U.S. Appl. No. 10/080,476, filed Feb. 22, 2002, Proudler et al.
U.S. Appl. No. 10/080,478, filed Feb. 22, 2002, Pearson et al.
U.S. Appl. No. 10/080,479, filed Feb. 22, 2002, Pearson et al.
U.S. Appl. No. 10/194,831, filed Jul. 11, 2002, Chen et al.
U.S. Appl. No. 10/206,812, filed Jul. 26, 2002, Proudler.
U.S. Appl. No. 10/208,718, filed Jul. 29, 2002, Chen et al.

Schneier, B., et al., "Applied Cryptography, Second Edition", John Wiley and Sons, Inc. pp. 34-38.

* cited by examiner

TRUSTED COMPUTING ENVIRONMENT

CROSS REFERENCE TO RELATED APPLICATIONS

The subject matter of the present application may also be related to the following U.S. Patent Applications: "Data Event Logging in Computing Platform," Ser. No. 09/979,902, filed Nov. 27, 2001; "Data Integrity Monitoring in Trusted Computing Entity," Ser. No. 09/979,903, filed Nov. 27, 2001; "Information System," Ser. No. 10/080,476, filed Feb. 22, 2002; "Method of and Apparatus for Investigating Transactions in a Data Processing Environment," Ser. No. 10/080,478, filed Feb. 22, 2002; "Method of and Apparatus for Ascertaining the Status of a Data Processing Environment," Ser. No. 10/080,479, filed Feb. 22, 2002; "Trusted Platform Evaluation," Ser. No. 10/194,831, filed Jul. 11, 2002; "Privacy of Data on a Computer Platform," Ser. No. 10/206,812, filed Jul. 26, 2002; and "Method and Apparatus for Locking an Application Within a Trusted Environment," Ser. No. 10/208,718, filed Jul. 29, 2002.

FIELD OF THE INVENTION

The invention relates establishing and/or maintaining a trusted computing environment. A first computing device can be said to regard a second computing device as trustworthy if the first computing device can expect the second computing device to operate or behave in a known manner.

BACKGROUND TO THE INVENTION

In the present context, "trust" and "trusted" are used to mean that a device or service can be relied upon to work in an intended, described or expected manner, and has not been tampered with or subverted in order to run malicious applications. A specification for trusted computing has been developed by the Trusted Computing Platform Alliance and can be found at www.trustedpc.org.

A conventional trusted computing device comprises a tamper resistant tester which can test the device to ascertain if it is trustworthy. The outcome of the test can be used within the device or reported to another computing device attempting to communicate with it. An exemplary trusted component is described in the applicants co-pending International Patent Application Publication No. PCT/GB00/00528 entitled "Trusted Computing Platform", the contents of which are incorporated by reference herein. If the outcome of the test is reported to another device, then that other device can use the report to determine a trust policy vis-a-vis the device offering the report, which controls its communication with the reporting device.

One disadvantage of a computing environment comprised of trusted computing devices of the kind mentioned above arises where a trusted computing device becomes compromised, e.g. by a virus. The trusted computing devices in the environment do not know if the other computing devices within the environment have been compromised unless they challenge the other computing devices to verify that they have not been compromised. The challenge-verification process can consume undesirable amounts of time and/or processing resources.

SUMMARY OF THE INVENTION

An object of the invention is the amelioration of the aforementioned disadvantage.

According to one aspect, the invention comprises a method of operating a trusted computing system, the method comprising providing an assessor to receive a report from, and pertaining to the trustworthiness of, a first computing device, and the assessor updating the trust policy of a second computing device in accordance with the report.

According to another aspect, the invention comprises an assessor for controlling a trusted computing system, the assessor comprising a receiver for receiving a report from, and pertaining to the trustworthiness of, a first computing device, an updater for updating the trust policy of a second computing device in accordance with the report, and a transmitter for transmitting the updated policy to the second computing device.

Hence, the invention can provide an efficient way of informing computing devices within an environment about the trustworthiness of other computing devices within the environment, so as to establish or maintain a trusted computing environment. In maintaining a trusted computing environment, the invention may enable a computing device to be sure of, and keep up to date with, the level of trustworthiness of other computing devices in the environment.

In one embodiment, the report contains an assessment of the trustworthiness that has been prepared by the reporting computing device itself. In another embodiment, the report provides information about the reporting computing device that is sufficient to allow the assessor to assess the trustworthiness of the reporting computing device. Preferably, the reporting computing device comprises a trusted component which evaluates the trustworthiness of the computing device and provides the report. The trusted component is preferably resistant to tampering and capable of applying a digital signature to the report to permit authentication of the report. The reporting computing device may be triggered to provide the report in response to a certain event or any one of a number of predetermined events. For example, the reporting computing device may be triggered to report by a request from an assessor for a trustworthiness report, or by being initialised or reset, or by the occurrence of an undesirable event (e.g. the computing device being compromised by a virus).

The assessor may, subsequent to receiving a trustworthiness report, update the trust policies of more than one computing device, one of which may be the computing device that provided the trustworthiness report.

A computing device in the context of the invention may be, for example, a computer or a peripheral (such as a scanner or printer) or other device having some data processing ability.

BRIEF DESCRIPTION OF THE FIGURES

By way of example only, some embodiments of the invention will now be described by reference to the accompanying drawings in which.

DETAILED DESCRIPTION OF THE PREFERRED EMBODIMENT

Figure 1:
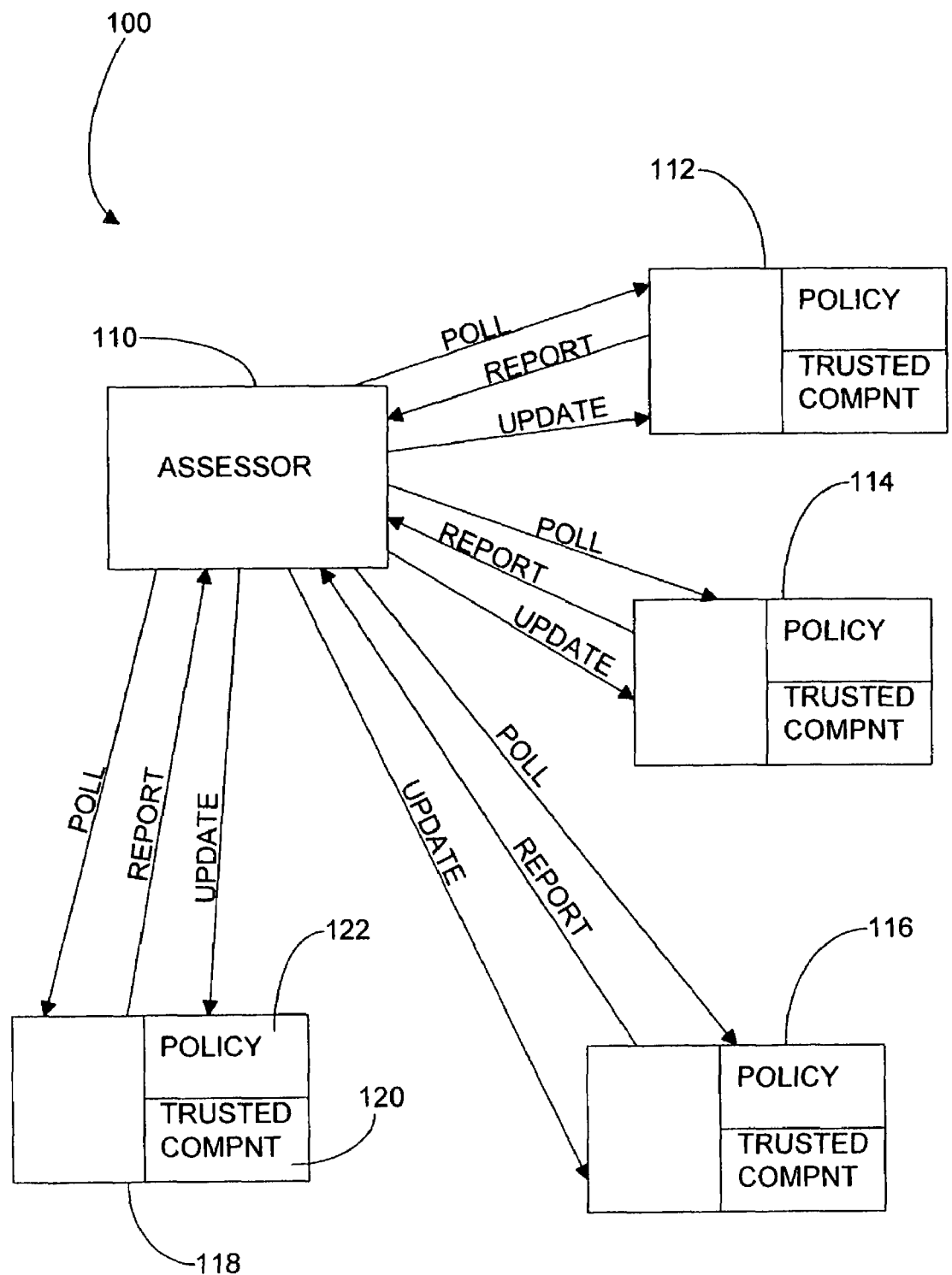
FIG. 1 is a block diagram of a trusted computing environment.

The trusted computing environment 100 of FIG. 1 comprises an assessing computer 110, or "assessor", which acts as a service provider to the computing devices in the environment, 112, 114, 116 and 118. In practice, the environment may comprise a different number of computing devices. Each computing device has at least some capacity for processing data and therefore at least some capacity for becoming untrustworthy or affecting the trustworthiness of other computing devices with which it communicates. In this embodiment, devices 112, 114 and 116 are networked computers and device 118 is a network printer serving devices 112, 114 and 116.

Each of the computing devices 112 to 118 comprises a trusted component and a memory 122 holding a policy. A policy allows a computing device to determine the level to which it trusts other computing devices sharing the environment.

As an example, a policy within a computing device may list the surrounding computing devices and specie the degree to which each of them is to be trusted. In order to set the degree of trust, a policy may specify that a particular computing device is to be interacted with for all purposes, selected purposes or not at all.

As a further example, a policy within a computing device may specify a list of components (either software or hardware) that are untrusted. If a computing device containing such a policy finds one or more of these components in another computing device, then it can determine accordingly the degree to which it trusts that other computing device.

Each trusted component 120 is arranged, in a known manner, to assess the trustworthiness of the computing device with which it is associated, and to report its assessment to the assessor 110. The report may contain, for example, a decision made by the trusted component as to the trustworthiness of its host computing device, or the trusted component may simply audit its host so that the report lists the components of its host. Examples of trusted components, and the monitoring of components or processes of a host, are found in the applicants co-pending International Patent Applications as follows: Publication No. PCT/GB00/02004 entitled "Data Logging in Computing Platform" filed on 25 May 2000 and Publication No. PCT/GB00/00495 entitled "Protection of the Configuration of Modules in Computing Apparatus", filed on 15 Feb. 2000, the contents of which are incorporated by reference.

The trusted component 120 can be arranged to be triggered to report by any of a number of events. For example, the report can be triggered by a request for a report received from the assessor 110, initialisation or resetting of the host computing device, or by some undesirable event (e.g. detection of the computing device being compromised by a known virus or the loading or addition of components unrecognised by the trusted component). Alternatively, the trusted component 120 can be arranged to make periodic reports to the assessor.

To maintain security, the trusted component 120 and the memory 122 holding the policy are incorporated in the corresponding computing device in such a manner that the trusted component 120 can perform its assessments on the computing device and yet the computing device is unable to modify the operation of the trusted component or the content of the policy. The memory 122 is arranged to accept updates to the policy that are certified by containing the digital signature of the assessor 110. Similarly, the trusted component is arranged to certify its outgoing reports with a digital signature which the assessor 110 can verify. The memory 122 containing the policy may be integrated with the trusted component 120.

Figure 2:
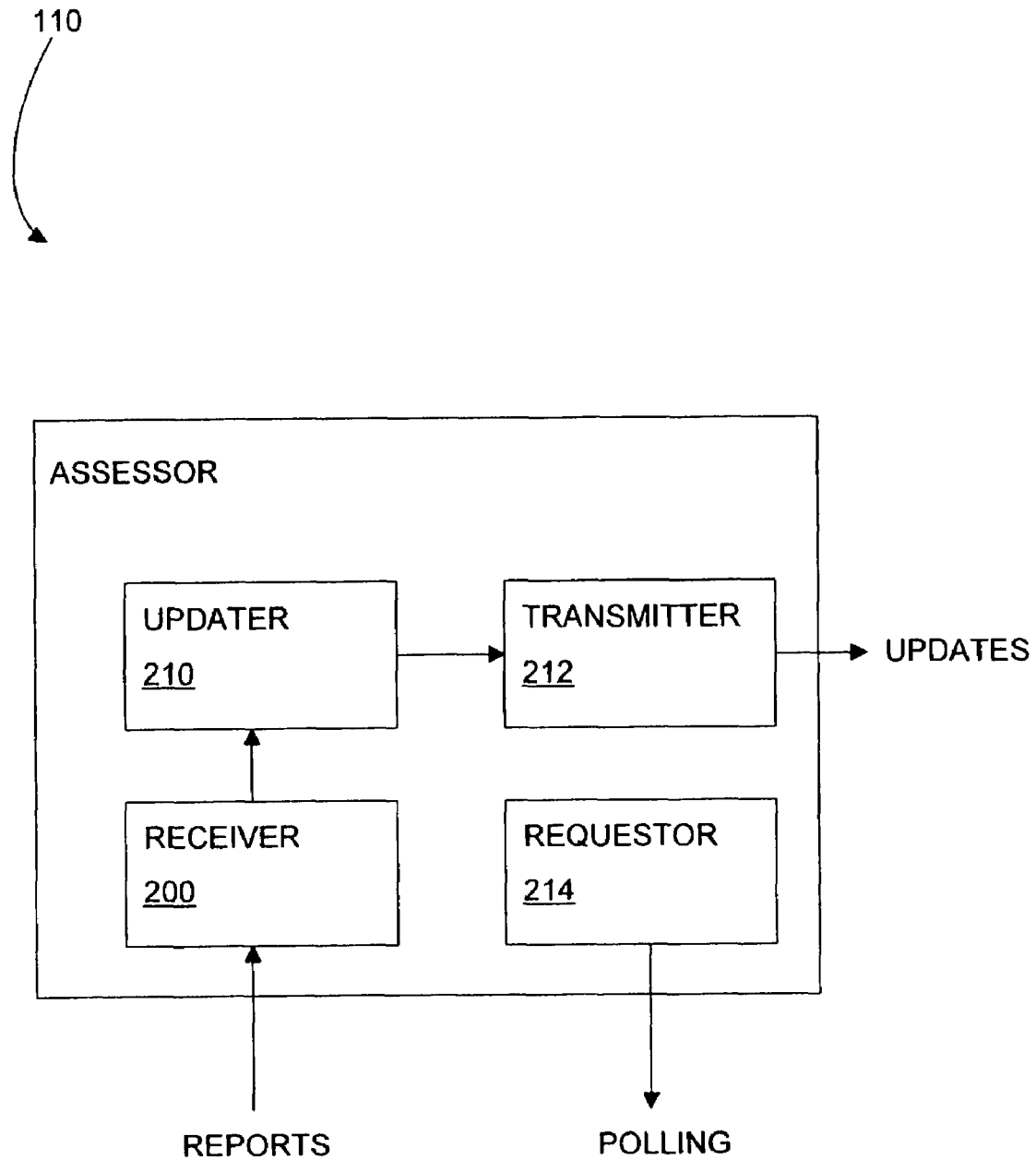
FIG. 2 is a block diagram of an assessor.

As shown in FIG. 2, the assessor 110 comprises a receiver 200, an updater 210, a transmitter 212 and a requestor 214. In response to being polled by the requestor 214, the receiver 200 receives the reports from the trusted components (which contain, for example, decisions on trustworthiness or component inventories), the updater 210 updates the computing devices' policies as necessary and the transmitter 212 disseminates the updated policies. Clearly it is desirable that the assessor 110 or at least relevant functions thereof are also trusted.

In the present embodiment, the assessor polls the trusted components within the computing devices 112 to 118 for trustworthiness reports. Consider the case where printer 118 has been contaminated by a virus. The report from this device alerts the assessor 110 to this fact and the assessor 110 responds by transmitting updated policies to the computing devices 112 to 118. The extent to which an updated policy curtails the extent to which the computing device hosting the policy interacts with the affected device 118 depends on the relationship between the two computing devices. In this example, the policy of device 116 is updated to reflect that it can only send urgent print requests to printer 118 and the policies of devices 112 and 114 are updated to reflect that they are not to interact with the printer 118 or, due the continuing potential for it to be compromised by printer 118, computing device 116.

Due to the invention, a trusted computing network or environment can be established or maintained without a computing device being required to directly challenge the trustworthiness of another device when it is required to communicate with that device.

The invention claimed is:

1. A method of operating a trusted computing system comprising a plurality of computing devices on a network, the method comprising:
   an assessor computing device receiving via the network a report from, and pertaining to the trustworthiness of, a first computing device; and
   the assessor computing device updating via the network the trust policy of a second computing device in accordance with the report.

2. A method according to claim 1, wherein the assessor computing device updates via the network the trust policies of multiple computing devices in accordance with the report.

3. A method according to claim 1, wherein the assessor computing device updates via the network policies by assessing the trustworthiness of the first computing device on the basis of information about the first computing device in the report.

4. A method according to claim 1, wherein the assessor computing device updates via the network policies on the basis of an assessment of the trustworthiness of the first computing device contained in the report.

5. A method according to claim 1, wherein the assessor computing device requests via the network the first computing device to make the report.

6. A method according to claim 1, wherein the first computing device is caused to report by being started-up or reset, or by an undesirable event occurring.

7. A method according to claim 1, wherein the first computing device is caused to report periodically.

8. A method according to claim 1 in which the second computing device authenticates the trust policy update issued by the assessor computing device before accepting it.

9. A method of operating a trusted computing system comprising a plurality of computing devices on a network, in which a first computing device has a trusted component which issues a report pertaining to the trustworthiness of the first computing device wherein a trust policy controller receives said report via the network from the trusted component and updates via the network the trust policy of a second computing device in accordance with said report.

10. A method of operating a trusted computing system comprising multiple computing devices on a network, the method comprising:
   a trust policy controller receiving reports via the network pertaining to the trustworthiness of each said computing device; and
   the trust policy controller determining the trust policy for each of said computing devices in accordance with the trustworthiness of other of said multiple computing devices as determined from said received reports.

11. An assessor computing device for controlling a trusted computing system comprising multiple computing devices on a network, the assessor comprising a receiver for receiving via the network a report from, and pertaining to the trustworthiness of, a first computing device, an updater for updating the trust policy of a second computing device in accordance with the report, and a transmitter for transmitting the updated policy to the second computing device via the network.

12. An assessor computing device according to claim 11, wherein the updater is arranged to update the trust policies of multiple computing devices in accordance with the report and the transmitter is arranged to transmit the updated policies to the multiple computing devices via the network.

13. An assessor computing device according to claim 11, wherein the updater updates policies by assessing the trustworthiness of the first computing device on the basis of information about the first computing device in the report.

14. An assessor computing device according to claim 11, wherein the updater updates policies on the basis of an assessment of the trustworthiness of the first computing device contained in the report.

15. An assessor computing device according to claim 11 further comprising a requestor, for requesting the report from the first computing device.

16. A system, comprising:
   an assessor computing device for controlling a trusted computing system comprising multiple computing devices on a network, the assessor comprising
      a receiver for receiving via the network a report from, and pertaining to the trustworthiness of, a first computing device,
      an updater for updating the trust policy of a second computing device in accordance with the report, and
      a transmitter for transmitting the updated policy to the second computing device, and
   the system further comprising first and second computing devices, wherein at least the first computing device comprises a reporter for sending via the network a trustworthiness report to the assessor computing device and at least the second computing device comprises a memory maintaining a trust policy such that the trust policy is modifiable by the transmitter.

17. A system as claimed in claim 16 in which the reporter comprises a trusted component associated with the first computing device.

18. A system, comprising:
   multiple computing devices on a network, and
   a trust policy controller which serves to determine the trust policy of said computing devices;
   each of said computing devices having associated with it a trust policy memory to store a trust policy for that computing device, and a trusted component which issues a report pertaining to the trustworthiness of that computing device; wherein
   the controller receives via the network reports from the trust components and updates via the network the trust policy in the trust policy memory of each computing device in accordance with the trustworthiness of other of said multiple computing devices as determined from said reports.

* * * * *